(12) United States Patent
Larsen et al.

(10) Patent No.: US 8,181,546 B2
(45) Date of Patent: May 22, 2012

(54) LINEAR ACTUATOR

(75) Inventors: Phillip Larsen, Sønderborg (DK); Martin Kahr Knudsen, Sydals (DK); René Sørensen, Gråsten (DK)

(73) Assignee: Linak A/S, Nordborg (DK)

( * ) Notice: Subject to any disclaimer, the term of this patent is extended or adjusted under 35 U.S.C. 154(b) by 1090 days.

(21) Appl. No.: 11/664,531

(22) PCT Filed: Oct. 15, 2005

(86) PCT No.: PCT/DK2005/000663
§ 371 (c)(1),
(2), (4) Date: Nov. 19, 2007

(87) PCT Pub. No.: WO2006/039931
PCT Pub. Date: Apr. 20, 2006

(65) Prior Publication Data
US 2008/0134815 A1  Jun. 12, 2008

(30) Foreign Application Priority Data
Oct. 15, 2004  (DK) .................................. 2004 01584

(51) Int. Cl.
*F16H 25/20* (2006.01)
(52) U.S. Cl. .................. 74/89.38; 74/89.23; 192/69
(58) Field of Classification Search ................. 74/89.38, 74/89.23; 192/69, 69.43, 69.9, 69.91
See application file for complete search history.

(56) References Cited

U.S. PATENT DOCUMENTS

| | | | | |
|---|---|---|---|---|
| 1,706,791 A | * | 3/1929 | Leighton .................... 29/893.36 |
| 3,910,131 A | * | 10/1975 | Richards ......................... 74/331 |
| 3,946,985 A | * | 3/1976 | Fujita et al. .............. 251/129.03 |
| 4,566,566 A | * | 1/1986 | Vuillet ........................... 192/24 |
| 6,240,800 B1 | * | 6/2001 | Bokamper et al. .............. 74/500 |
| 7,066,041 B2 | | 6/2006 | Nielsen |
| 2004/0194564 A1 | | 10/2004 | Nielsen et al. |

FOREIGN PATENT DOCUMENTS

| | | |
|---|---|---|
| EP | 0577541 | 1/1994 |
| EP | 0647799 | 4/1995 |
| EP | 0685662 | 12/1995 |
| WO | 0229284 | 4/2002 |

* cited by examiner

*Primary Examiner* — William C Joyce
(74) *Attorney, Agent, or Firm* — Dykema Gossett PLLC

(57) ABSTRACT

In an actuator, a quick release unit is introduced in a transmission between an activating element and a reversible electric motor for disengaging the activating element (5) from the electric motor and the part of the transmission (6) which is disposed from the motor to the quick release unit. This quick release unit comprises two cylindrical coupling parts (8, 9) provided with axially extending and mutually engaging torque-transferring means (21a, 21b), and where the two coupling parts (8, 9) are mutually axially displaceable and kept in engagement with each other by a spring (25). The two coupling parts may be displaced mutually against the spring (25) by a release mechanism, so that the torque-transferring connection (21a, 21b) between the two coupling parts (8, 9) is interrupted. The quick release unit may be made compact, and especially in connection with a worm wheel (6) with a cylindrical part on the side it may be substantially received in the cylindrical part.

15 Claims, 5 Drawing Sheets

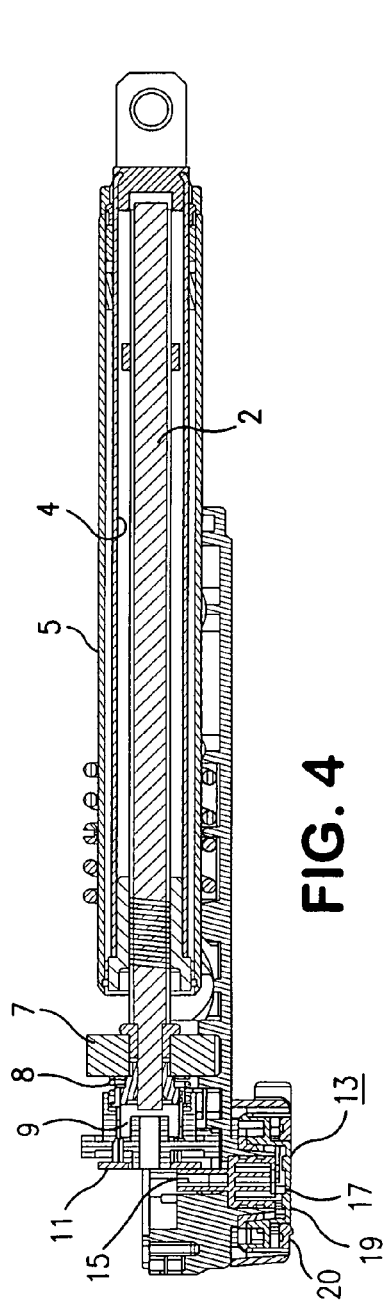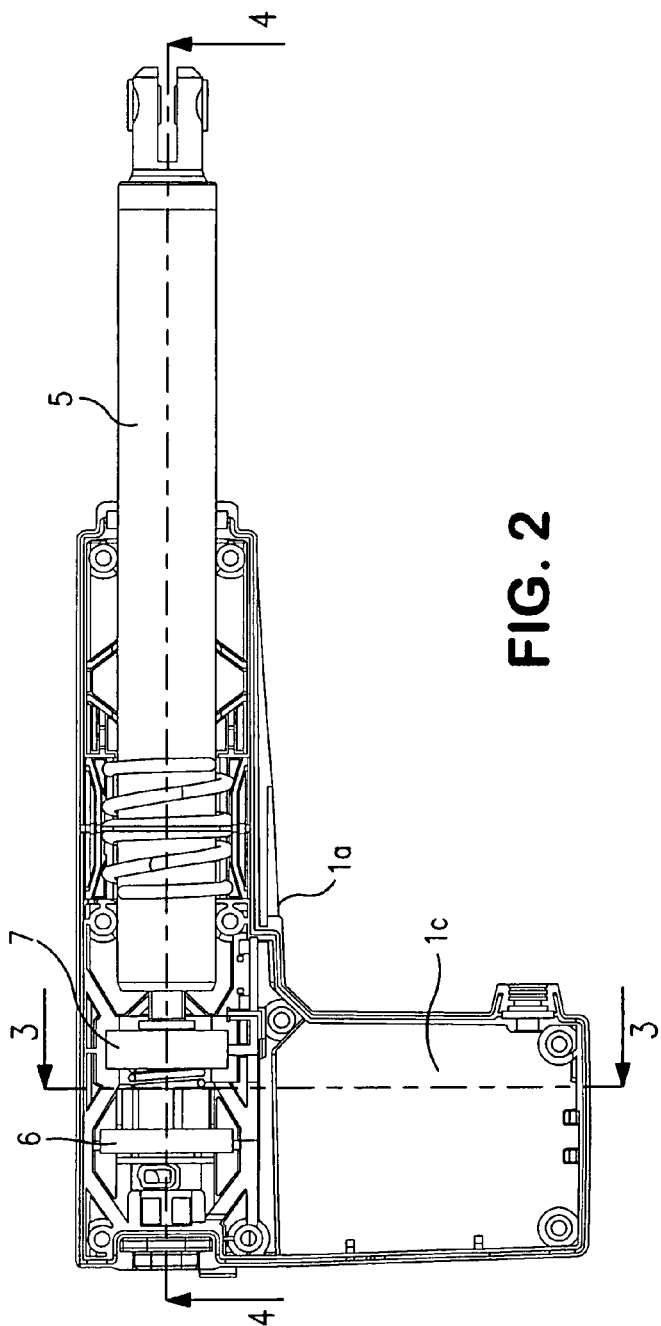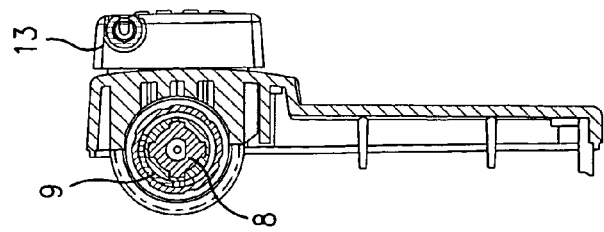
FIG. 4
FIG. 2
FIG. 3

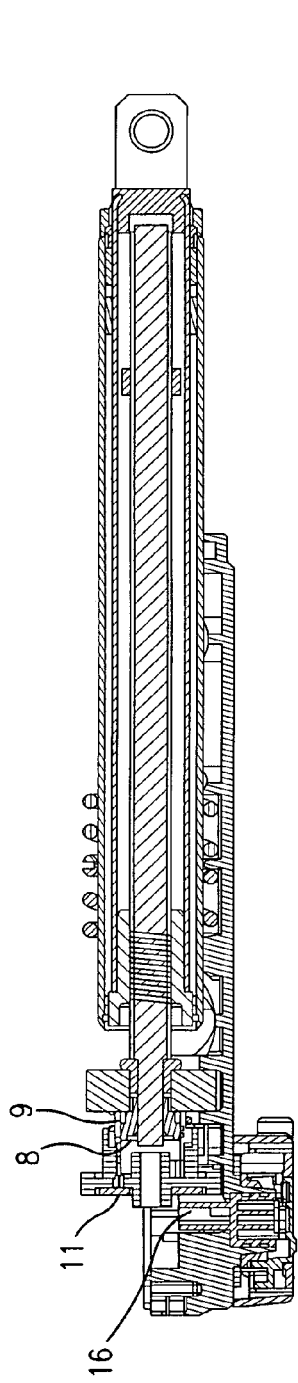
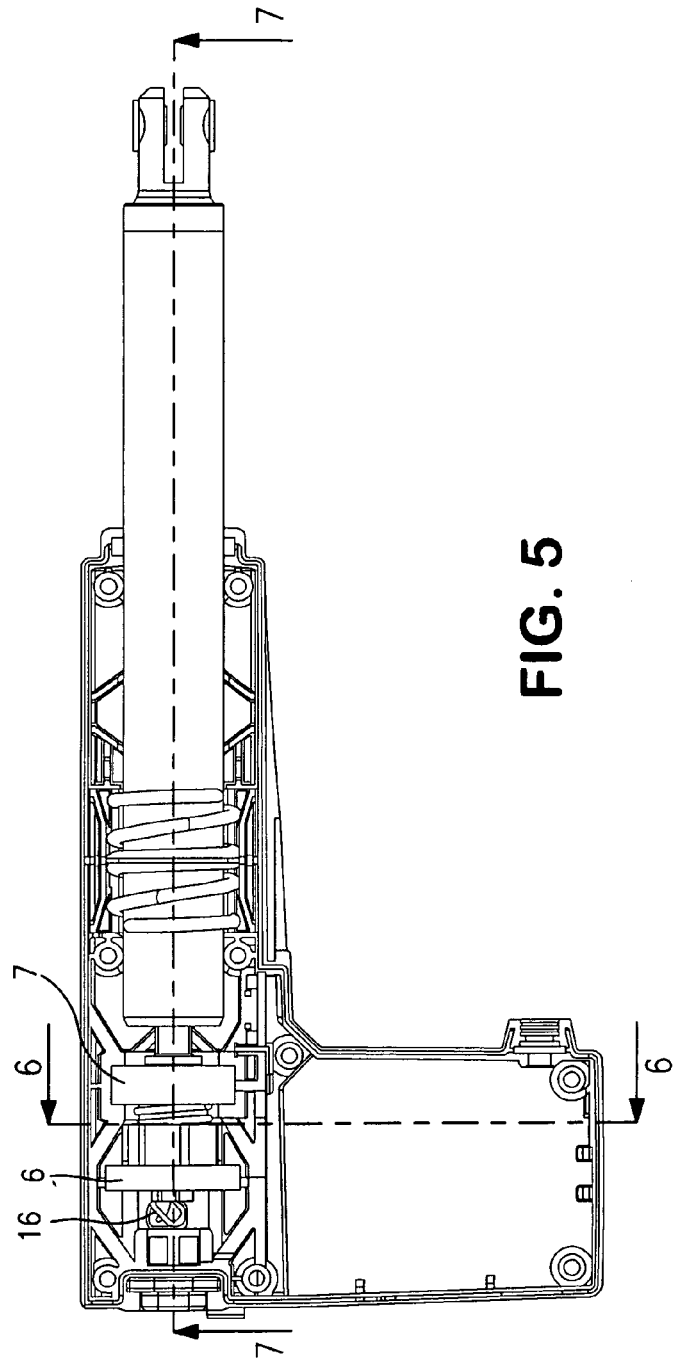
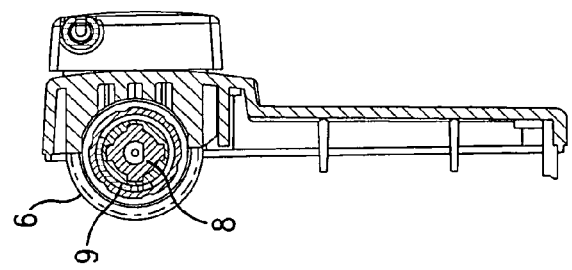
FIG. 7
FIG. 5
FIG. 6

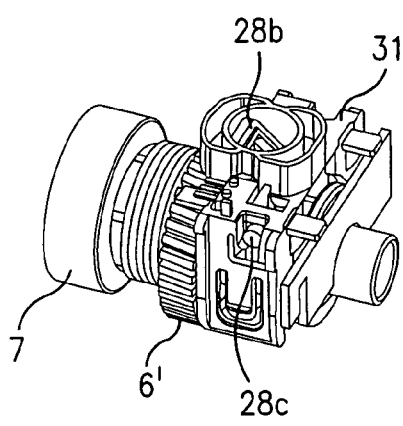
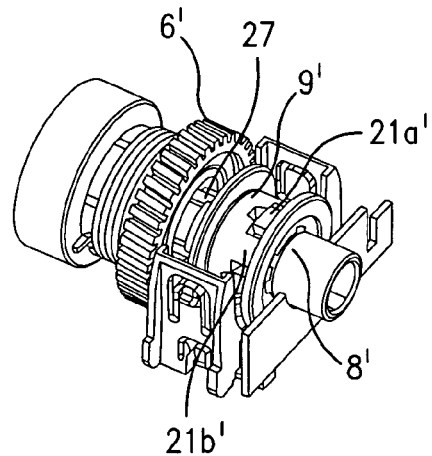
FIG. 10  FIG. 11
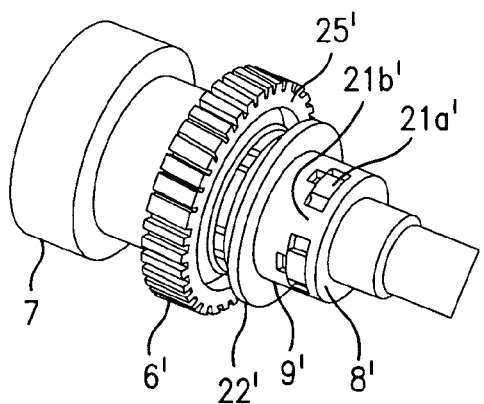
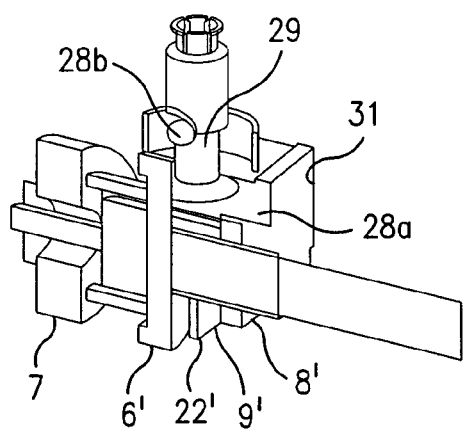
FIG. 12  FIG. 13
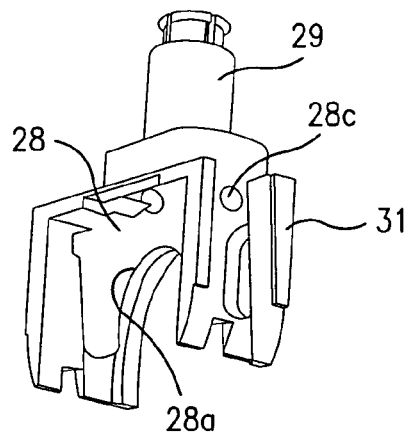
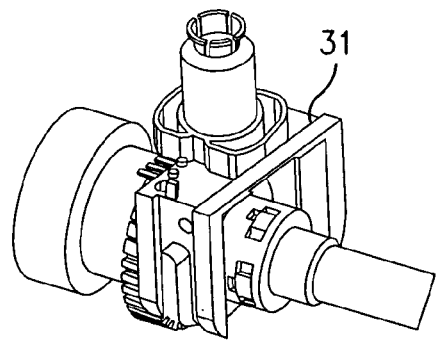
FIG. 14  FIG. 15

LINEAR ACTUATOR

BACKGROUND OF THE INVENTION

1. Field of the Invention

The invention relates to a linear actuator which includes a quick release mechanism.

2. The Prior Art

A quick release unit in an actuator is used for temporarily interrupting the connection to the inert part of the transmission and the motor so that the activating element may be adjusted manually. As an example of where a quick release unit is used, reference may be made to hospital beds, patient lifters, emergency exits or fire doors, and other structures where it is important, if not vital, to be able to make a spontaneous adjustment of the activating element.

Actuators having a quick release function are known inter alia from EP 685 662 B1 and WO 03/033946 A1 to Linak A/S. The two documents relate to a quick release unit based on two cylindrical elements wound with a releasable coupling spring. The structures are excellent as far as they go, but they occupy some space, partly because the coupling spring is to have a certain length, and partly because the release mechanism is also bulky.

For the sake of completeness, it may be mentioned that EP 577 541 B1 to Linak A/S discloses another quick release unit with two angularly positioned gear wheels, where the one gear wheel may be displaced out of engagement.

SUMMARY OF THE INVENTION

This is achieved according to the invention by constructing the actuator so as to include a quick release unit having two coaxially positioned coupling parts which are spring biased into engagement to connect the spindle to the drive motor but which can be axially moved relative to one another by the release mechanism to disengage the coupling parts and disconnect the spindle from the drive motor. The structure thus disclosed opens up the possibility of providing a compact quick release unit.

The quick release unit will be particularly compact if it is constructed such that the one cylindrical coupling part extends into the other. Then, the length does not become greater or much greater than the longest coupling part.

The structure may be even more compact when the quick release unit is arranged in connection with a gear wheel, and where the two coupling parts are received completely or partly in a hollow in the gear wheel. This is particularly expedient in connection with actuators of the type where a worm wheel has a cylindrical projection on the one side.

The compactness may be accentuated additionally in that the torque-transferring, mutually engaging means are arranged such that the two coupling parts have to be pressed toward each other in order to clear each other. This means that no additional space is required at the sides for the quick release unit to be released.

The compact structure is additionally accentuated by the use of a cylindrical spring arranged between a collar on the external and the internal coupling part, respectively. The collar on the internal coupling part may be formed by a disc in engagement with an annular groove on the coupling part. The essential parts of the quick release unit then just appear as a compact cylindrical unit.

Again, when the torque-transferring engaging means on the outer coupling part are configured as ribs extending into the hollow thereof, and the other coupling part has a narrowed end capable of passing through the hole, and the step between the narrowed end and the outer side of the coupling part is configured with corresponding ribs, the length of the quick release unit does not become much longer than the longest coupling part.

In an embodiment, the internal coupling part is expediently secured on the shaft end of the spindle, while the external coupling part is mounted in engagement with the gear wheel which drives the spindle.

The activating means may be made compact by configuring it with a disc having at least one leg, which protrudes through an opening in the gear wheel, and which, when being pressed in toward the gear wheel, pushes the outer coupling part out of engagement with the inner coupling part. Movement of the disc may be effected by an eccentric, which may merely be a thickened part on a shaft passed out to an operating handle.

In another embodiment, the coupling parts are arranged in extension of each other on the shaft end of the spindle, which gives a good mount, but a less compact structure, but the good mount per se provides the possibility of reducing the length of the coupling parts.

In this embodiment, it is expedient that the facing edges of the coupling parts are configured with the torque-transferring mutually engaging means in the form of claws. If, upon release of the quick release unit, it is desired to couple it again en route, this involves the risk that the claws of the two coupling parts will ride on the end of each other when the spindle rotates. To ensure the re-coupling, the quick release unit is constructed such that a space is present between the claws of such a size that the claws enter into engagement also during the rotation of the spindle.

In a compact version, the spring is in the form of a cylindrical spring arranged between a collar on the one coupling part and the side of the worm wheel, and at the same time the coupling part may be moved against the spring in toward the worm wheel to interrupt the connection between the two coupling parts.

In an embodiment of the release mechanism, it comprises a tilting element which is arranged rotatably about an axis, and which, with a lower part, in a rest position, is fitted down over the coupling part with a pair of legs and rests against the collar opposite the spring, which contributes to a short fitting length.

In an embodiment of the release mechanism, it comprises an axially displaceable element having a hook-shaped end, which extends into a recess in an upper inclined part of the tilting element, and which is connected with the operating handle via a cable, which does not contribute to an increased fitting length either.

A couple of examples of linear actuators according to the invention will be described more fully below with reference to the accompanying drawings.

BRIEF DESCRIPTION OF THE DRAWINGS

FIG. 2 shows the lower part of the actuator, seen from above,

FIG. 3 shows a cross-section along the line 3-3 in FIG. 2,

FIG. 4 shows a longitudinal section along the line 4-4 in FIG. 2,

FIG. 5 shows the lowermost part of the actuator, seen from above,

FIG. 6 shows a cross-section along the line 6-6 in FIG. 5,

FIG. 7 shows a longitudinal section along the line 7-7 in FIG. 5,

FIG. 10 shows a perspective view from above of the quick release unit, gear wheel and bearing, FIG. 11 shows the same as FIG. 10, but seen from below, FIG. 12 shows a perspective view of the quick release unit without a release mechanism, FIG. 13 shows a cross-section through the quick release unit, FIG. 14 shows a perspective view of the release mechanism, and FIG. 15 shows a perspective view of the quick release unit on the shaft end of the spindle.

DETAILED DESCRIPTION OF THE PREFERRED EMBODIMENTS

Figures 1, 1A:
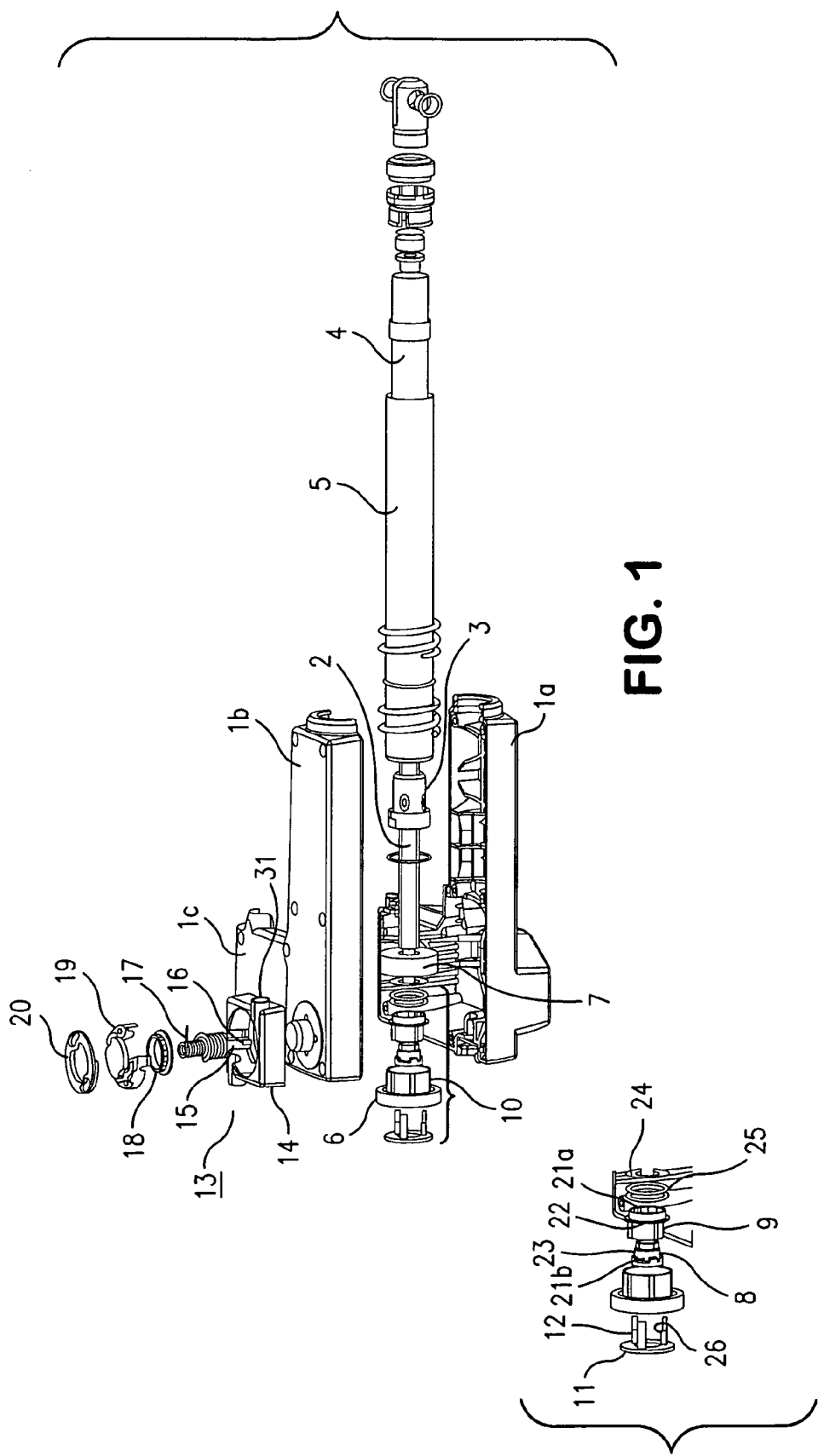
FIG. 1 shows an exploded view of an actuator according to one embodiment of the invention.
FIG. 1a shows an enlarged detail of FIG. 1.
Figure 8:
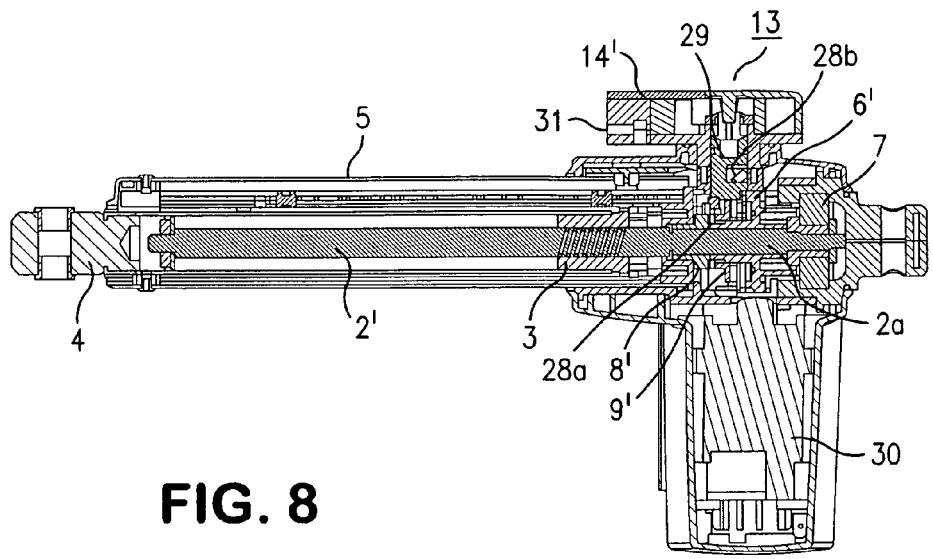
FIG. 8 shows a longitudinal section through a second embodiment of the actuator.
Figure 9:
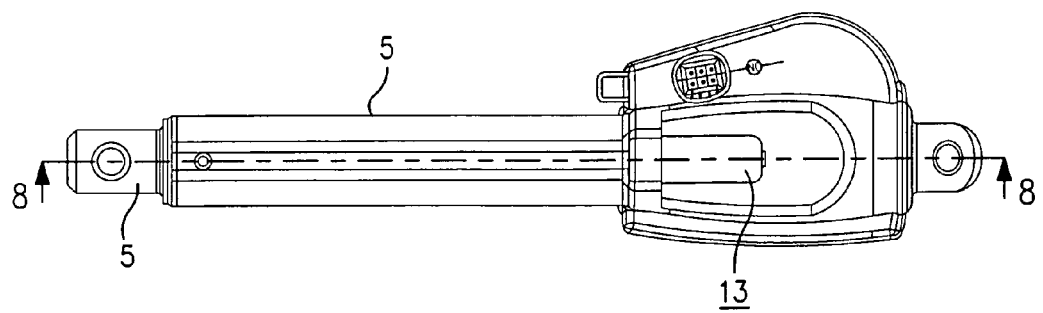
FIG. 9 shows the actuator of FIG. 8, seen from above.

As will appear from FIG. 1, the main components of the actuator are formed by a two-part cabinet 1a, 1b having a reversible electric motor which, via a worm gear, drives a spindle 2 with a spindle nut 3 to which a thrust rod 4 (inner tube) surrounded by an outer pipe 5 is secured. In general, the basic structure of the actuator is of the same type as disclosed in the European Patent EP 647 799 B1 to Linak A/S, which is hereby incorporated herein by way of reference. It is observed that the motor is not shown in the drawing, but it is positioned in the perpendicular section 1c of the cabinet. The shaft member is extended into a worm in engagement with a worm wheel 6 mounted on a front member of the motor. It is observed that the spindle 2 is arranged in the cabinet with a ball bearing 7. Otherwise, only the parts of the actuator necessary to understand the invention will be described.

Initially, it is observed that the difference between FIGS. 2-4 and FIGS. 5-7 is that the quick release unit in FIGS. 5-7 is released, while this is not the case in FIGS. 2-4.

According to the invention, the actuator is provided with a quick release unit comprising two coupling parts 8, 9, where the one inner coupling part 8 is mounted on a shaft end of the spindle 2 with a D groove connection, while the other outer coupling part 9 is mounted in the worm wheel 6. This worm wheel is configured with a hollow cylindrical part 10 on the side facing out toward the front end of the actuator, and the outer coupling part 9 is received therein in a torque-transferring manner by a splined connection.

The rear side of the worm wheel has arranged thereon a circular disc 11 with three legs 12 which extend through openings in the worm wheel, protrude into the hollow of the cylindrical part 10 and are guided in grooves therein. The outer end of each of the legs 12 is provided with a projection facing in toward the wall of the hollow and cooperates with an edge therein, so that the disc cannot be pulled out unintentionally.

The upper part 1b of the cabinet accommodates a release mechanism 13 in a housing 14 having an entry 31 for a cable (not shown) which leads out to an operating handle (not shown). The release mechanism comprises a shaft member 15 passed down behind the circular disc 11. The end of the shaft member has a boss 16 which is caused to contact the disc 11 by rotation of the shaft member to press the disc forwards toward the worm wheel. The shaft member is spring-biased by a spring 17 to the inactive position, i.e. a position in which the boss 16 is not in contact with the disc 11. A ring 18 is secured to the upper end of the shaft, and the end of the cable, which leads out to the operating handle, is secured in this ring. The circular recess in the housing is closed by a cover 19 and a ring 20.

Forwardly, the outer coupling part 9, which is received in the worm wheel, has internal torque-transferring engaging means in the form of the one part of a splined connection 21a. An abutment in the form of a collar 22 is provided on the outer side of the coupling part 9 at the front end in front of the splined connection to the worm wheel.

Forwardly, the inner coupling part 8 has a narrowed part 23 which can pass through the opening of the part of the splined connection 21a which is present in the outer coupling part 9. The other part of the splined connection 21b is provided in the step between the narrowed end 23 and the outer side of the coupling part. A groove for a disc 24 forming an abutment is present in the narrowed part 23. In the opening, the disc has two diametrically positioned projections which fit in two corresponding slots which lead into the groove where the disc is rotated and thereby secured.

A screw spring 25 is coaxially arranged relative to the coupling parts 8 and 9 between the collar 22 on the outer coupling part 9 and the disc abutment 24 on the inner coupling part 8. The spring causes the two coupling parts to be in mutual engagement via the splined connection 21a, 21b. The torque from the worm wheel 6 is transferred to the outer coupling part 9 via the splined connection in the hollow of the cylindrical part of the worm wheel and the outer side of the coupling part. The torque is transferred from the outer coupling part 9 to the inner coupling part 8 via the splined connection 21a, 21b and from there further on to the spindle 2 via the D groove in the inner coupling part.

The quick release unit is activated by operating the release mechanism, whereby the boss 16 on the shaft member 15 is turned into contact with the disc 11, which is thereby pressed forwards. The outer coupling part will thereby be pushed forwards by the legs 12 on the disc 11. The coupling part 9 rests with the rear edge on projections 26 on the legs which protrude into the hollow. The splined connection 21a, 21b between the outer coupling part 9 and the inner coupling part 8 will then be interrupted, whereby the spindle may rotate freely independently of the transmission and the motor. The thrust rod 4 of the actuator and thereby the element connected with it may then be adjusted manually.

It is observed for the sake of completeness that the abutment disc 24 on the inner coupling part 8 rests against the rear side of the ball bearing 7 and is thereby fixed against axial movement. When the handle of the release mechanism is released again, the spring 25 will press the outer coupling part 9 rearwards until the splined connection with the inner coupling part 8 is re-established.

FIGS. 8-13 of the drawing show a second embodiment of the actuator according to the invention. The same parts are designated by the same reference numerals as are used in the foregoing. The basic structure of the actuator is of the same type as is shown in FIGS. 1-8 and described on page 7, line 23 to page 11, line 14 in the International Application WO 02/29284 A1 to Linak A/S, which is hereby incorporated herein by way of reference.

The quick release unit again comprises two coupling parts 8', 9', where the one coupling part 8' is fixedly mounted on the shaft end of the spindle 2', while the other coupling part 9' is mounted on the worm wheel 6' which, here, is mounted on the shaft end of the spindle. On the side facing out toward the front end of the actuator, the worm wheel 6' is configured with a cylindrical part 27, and the coupling part 9' is fixed against rotation, but is axially displaceably mounted on the cylindrical part 27 with a splined connection. Moreover, the coupling part 9' is provided with a collar 22' in the form of a spring ring, and a spring 25' is provided between this collar 22' and the side of the worm wheel 6, said spring keeping the coupling part 9' in engagement with the coupling part 8' on the shaft end 2a of the spindle. The facing edges of the two coupling parts 8', 9' are configured with torque-transferring mutually engaging means, here in the form of claws 21a', 21b'.

The release mechanism 13' comprises a tilting element 28 which is arranged rotatably about an axis 28c, and which, with a lower part 28a, in a rest position, is fitted down over the coupling part 9' with a pair of legs and rests against the collar 22' opposite the spring 25'. The tilting element 28 is arranged in a U-shaped housing 31 in the actuator. An axially displaceable element 29 is fitted through an opening, which simultaneously serves as a guide, said element 29 having a hook-shaped end which extends into a recess in an upper inclined part 28b of the tilting element and is moreover connected with an operating handle via a cable. The cable is secured at the top of the element 29 and is passed in a curve out through the opening 31 in an outer housing 14' secured to the actual housing of the actuator. The displaceable element 29 is secured against sagging with a locking disc 32 at the top which rides on an edge in the opening of the element 29. Operation of the handle causes the element 29 to be pulled axially upwards, whereby the tilting element 28 rotates about its axis 28c, and the legs are then pressed against the collar 22' and thereby presses the coupling part 9' in toward the worm wheel 6' and out of engagement with the coupling part 8', whereby the spindle 4' is released from the transmission and the motor. The thrust rod of the actuator may thereby be adjusted manually, and when the spindle is not self-locking, the load will cause the spindle to rotate. When the operating handle is released again, the spring 25' again presses the coupling part 9' into engagement with the coupling part 8'. Re-coupling en route is possible in that the claws 21a', 21b' have a relatively great mutual clearance, which ensures that the claws will not ride on top of each other during the rotation of the spindle.

The invention thus provides an actuator with a compact structure of the quick release unit which does not cause an increased fitting length of the actuator.

The invention claimed is:

1. A linear actuator comprising an outer housing having a reversible electric motor which, via a transmission with at least one gear wheel, drives a spindle with a shaft end, a bearing on the shaft end for the mounting of the spindle, a spindle nut on the spindle and which fixed against rotation is moved in and out of the spindle depending on the direction of rotation of the motor, an activating element connected with the spindle nut, a quick release unit disposed in the transmission between the activating element and the reversible electric motor for disengaging the activating element from the electric motor and the part of the transmission which is disposed from the motor to the quick release unit, said quick release unit comprising two cylindrical coupling parts, said quick release unit being adapted to be activated by a release mechanism, wherein the quick release unit is disposed at the gear wheel, and the two cylindrical coupling parts are provided with axially-extending and mutually-engaged, torque-transferring means, and the two coupling parts are mutually axially displaceable, and including a spring which is coaxially positioned relative to said two coupling parts to cause said two coupling parts to be engaged, said release mechanism when activated pushing the two coupling parts towards one another to disengage the torque-transferring means therebetween.

2. The actuator according to claim 1, wherein said two cylindrical coupling parts include an inner cylindrical coupling part which extends into an outer cylindrical coupling part.

3. The actuator according to claim 2, wherein said inner and outer coupling parts are received completely or partly in a hollow in the gear wheel.

4. The actuator according to claim 3, wherein the internal coupling part is secured on the end of a spindle, and wherein the external coupling part is in engagement with the gear wheel.

5. The actuator according to claim 4, wherein the release mechanism comprises an eccentric in connection with the disc.

6. The actuator according to claim 3, wherein the release mechanism comprises a disc with at least one leg which protrudes through an opening in the gear wheel, and which, when pressed in toward the gear wheel, pushes the outer coupling part out of engagement with the inner coupling part.

7. The actuator according to claim 2, wherein the spring is a cylindrical spring arranged between a collar on the outer coupling part and a collar on the inner coupling part, respectively.

8. The actuator according to claim 7, wherein the collar on the inner coupling part is formed by a disc in engagement with an annular groove oh the inner coupling part.

9. The actuator according to claim 2, wherein the torque-transferring engaging means on the outer coupling part are configured as ribs in a hollow thereof, wherein the inner coupling part has a narrowed end capable of passing through an opening defined by the ribs, and wherein a step between the narrowed end and an outer side of the inner coupling part is configured with corresponding ribs.

10. The actuator according to claim 1, wherein the coupling parts are arranged in extension of each other on the shaft end of the spindle.

11. The actuator according to claim 10, wherein the facing edges of the coupling parts are configured with the torque-transferring mutually engaging means in the form of claws.

12. The actuator according to claim 11, wherein the quick release unit is configured such that between the claws there is a space of such a size that the claws enter into engagement also during rotation of the spindle.

13. A linear actuator comprising an outer housing having a reversible electric motor which, via a transmission with at least one gear wheel, drives a spindle with a shaft end, a bearing on the shaft end for the mounting of the spindle, a spindle nut on the spindle and which fixed against rotation is moved in and out of the spindle depending on the direction of rotation of the motor, an activating element connected with the spindle nut, a quick release unit disposed in the transmission between the activating element and the reversible electric motor for disengaging the activating element from the electric motor and the part of the transmission which is disposed from the motor to the quick release unit, said quick release unit comprising two cylindrical coupling parts, said quick release unit being adapted to be activated by a release mechanism, wherein the quick release unit is disposed at the gear wheel, and the two cylindrical coupling parts are provided with axially-extending and mutually-engaged, torque-transferring means, and the two coupling parts are mutually axially displaceable, and including a spring which is coaxially positioned relative to said two coupling parts to cause said two coupling parts to be engaged, said release mechanism when activated pushing the two coupling parts apart to disconnect the torque-transferring connection therebetween, wherein the coupling parts are arranged in extension of each other on a shaft end of the spindle, wherein the spring is a cylindrical spring arranged between a collar on the coupling part and the side of the worm wheel, and wherein the coupling part may be displaced against the spring in toward the worm wheel to interrupt the connection between the two coupling parts.

14. The actuator according to claim 13, wherein the release mechanism comprises a tilting element which is arranged rotatably about an axis, and which, with a lower part, in a rest position, is fitted down over the coupling part with a pair of legs and rests against the collar opposite the spring.

15. The actuator according to claim 14, wherein the release mechanism comprises an axially displaceable element with a hook-shaped end, which extends into a recess in an upper inclined part of the tilting element and which is connected with the operating handle via a cable.

* * * * *